US008384938B2

(12) United States Patent
Nakayama

(10) Patent No.: US 8,384,938 B2
(45) Date of Patent: Feb. 26, 2013

(54) IMAGE READING APPARATUS CAPABLE OF SUPPORTING A PLURALITY OF TRANSMISSION MODES AND SELECTING THE TRANSMISSION MODE

(75) Inventor: Hiroto Nakayama, Nagoya (JP)

(73) Assignee: Brother Kogyo Kabushiki Kaisha, Aichi-Ken, Nagoya-Shi (JP)

( * ) Notice: Subject to any disclaimer, the term of this patent is extended or adjusted under 35 U.S.C. 154(b) by 531 days.

(21) Appl. No.: 12/643,329

(22) Filed: Dec. 21, 2009

(65) Prior Publication Data
US 2010/0165393 A1    Jul. 1, 2010

(30) Foreign Application Priority Data

Dec. 25, 2008  (JP) ................................ 2008-331225

(51) Int. Cl.
G06F 3/12 (2006.01)
G06F 3/00 (2006.01)
G06F 5/00 (2006.01)
G06F 13/42 (2006.01)
G06K 15/00 (2006.01)
H04N 1/60 (2006.01)
H04N 1/00 (2006.01)

(52) U.S. Cl. ....... 358/1.15; 358/1.14; 358/1.9; 358/400; 358/440; 710/11; 710/14; 710/38; 710/46; 710/105

(58) Field of Classification Search ................ 358/1.15, 358/402, 1.9, 474, 1.14, 400, 440, 476; 370/351, 370/401, 238, 352, 396; 709/206, 223, 230, 709/232, 245; 710/1, 4, 11, 14, 26, 3, 38, 710/46, 53, 105, 301

See application file for complete search history.

(56) References Cited

U.S. PATENT DOCUMENTS

| 6,519,247 | B1 | 2/2003 | Yoshida | |
|---|---|---|---|---|
| 2002/0018248 | A1* | 2/2002 | Ohhashi et al. | 358/474 |
| 2002/0051222 | A1 | 5/2002 | Nishimura | |
| 2003/0165126 | A1 | 9/2003 | Sugita | |
| 2004/0187022 | A1* | 9/2004 | Asada et al. | 713/200 |

(Continued)

FOREIGN PATENT DOCUMENTS

| JP | A-5-252290 | 9/1993 |
|---|---|---|
| JP | 10-243019 A | 9/1998 |

(Continued)

OTHER PUBLICATIONS

Hideaki, Facsimile Equipment, May 21, 1996, Machine Translation Japanese Patent Application Publication, JP08130657, all pages.*

(Continued)

*Primary Examiner* — Benny Q Tieu
*Assistant Examiner* — Ngon Nguyen
(74) *Attorney, Agent, or Firm* — Scully, Scott, Murphy & Presser, P.C.

(57) ABSTRACT

An image reading apparatus includes: a reading unit; a transmission unit and a limiting unit. The reading unit is configured to read a document and create image data. The transmission unit supports a plurality of transmission modes, and is configured to transmit the image data to an external apparatus using at least one selected from the plurality of transmission modes. The limiting unit is configured to limit selectable transmission modes of the transmission unit based on at least one of: a user-designated attribute of the document set by a user; a reading attribute of the reading unit; and a content of the document read by the reading unit.

15 Claims, 11 Drawing Sheets

U.S. PATENT DOCUMENTS

| | | | |
|---|---|---|---|
| 2006/0059198 A1* | 3/2006 | Uchida et al. | 707/104.1 |
| 2006/0192990 A1* | 8/2006 | Tonegawa | 358/1.15 |
| 2008/0192293 A1* | 8/2008 | Sugimoto | 358/1.15 |
| 2009/0030939 A1* | 1/2009 | Terao | 707/103 Y |
| 2009/0109482 A1* | 4/2009 | Sato | 358/1.15 |

FOREIGN PATENT DOCUMENTS

| | | |
|---|---|---|
| JP | 11-220492 | 8/1999 |
| JP | 2002-016753 A | 1/2002 |
| JP | 2003-198819 | 7/2003 |
| JP | A-2003-198416 | 7/2003 |
| JP | A-2003-209537 | 7/2003 |
| JP | 2003-244412 A | 8/2003 |
| JP | 2008-252456 A | 10/2008 |

OTHER PUBLICATIONS

Japanese Official Action dated Nov. 9, 2010 together with English-language translation.

Official Action dated Jun. 14, 2011 received from the Japanese Patent Office from related Japanese Application No. 2008-331225, together with a partial English-language translation.

\* cited by examiner

| READING PARAMETER | SECRECY LEVEL |
|---|---|
| 1200 dpi | HIGH |
| 600 dpi | LOW |
| COLOR | MIDDLE |
| MONOCHROME | LOW |

FIG. 12

| CHARACTER STRING | SECRECY LEVEL |
|---|---|
| CONFIDENTIAL | HIGH |
| FOR INTERNAL USE ONLY | HIGH |
| PRESIDENT | MIDDLE |
| MANAGEMENT DEPARTMENT | MIDDLE |

343

IMAGE READING APPARATUS CAPABLE OF SUPPORTING A PLURALITY OF TRANSMISSION MODES AND SELECTING THE TRANSMISSION MODE

CROSS-REFERENCE TO RELATED APPLICATIONS

This application claims priority from Japanese Patent Application No. 2008-331225 filed on Dec. 25, 2008, the entire contents of which are incorporated herein by reference.

TECHNICAL FIELD

The present invention relates to an image reading apparatus having a function of reading a document and transmitting image data of the document. More specifically, the invention relates to an image reading apparatus capable of supporting a plurality of transmission modes and selecting the transmission mode.

BACKGROUND

There is an image reading apparatus having a scanner function of reading a document and a transmission function of transmitting image data to information processing apparatus. There is also known an apparatus supporting a plurality of transmission modes in the transmission function. For example, a known image forming apparatus supporting a plurality transmission modes has a transmission function of transmitting image data to a computer, a transmission function of transmitting image data as an attachment file to an e-mail address, and a transmission function of FTP-transmitting image data to an FTP server.

SUMMARY

Image data which has been read has various indexes for defining its attribute. For example, as one example of the indexes, there is secrecy of data, and there are various image data having various high to low secrecy levels. On the other hand, transmission modes have various properties, for example, with different security levels, respectively. However, the above-described image reading apparatus does not limit the transmission mode with respect to data to be transmitted. As a result, for example, image data with high secrecy level may be transmitted by a transmission mode with low security level, which may lead leakage of information. Incidentally, the indexes for defining the attribute of the image data contain various indexes such as the data amount of image data or the amounts of accounting of various transmission modes.

The invention was made in consideration for the above-described circumstances, and an object thereof is to provide an image reading apparatus capable of using a transmission mode appropriate for image data to be transmitted.

According to an aspect of the invention, there is provided an image reading apparatus comprising: a reading unit configured to read a document and create image data; a transmission unit supporting a plurality of transmission modes and configured to transmit the image data to an external apparatus using at least one selected from the plurality of transmission modes; and a limiting unit configured to limit selectable transmission modes of the transmission unit based on at least one of: a user-designated attribute of the document set by a user; a reading attribute of the reading unit; and a content of the document read by the reading unit.

According to another aspect of the invention, there is provided a computer readable medium having a computer program stored thereon and readable by a computer; said computer program for control an image reading apparatus that comprises a reading unit configured to read a document and create image data, a transmission unit supporting a plurality of transmission modes and configured to transmit the image data to an external apparatus using at least one selected from the plurality of transmission modes, and a control unit; said computer program, when executed by the control unit, to cause the control unit to perform operations comprising: obtain at least one of a user-designated attribute of the document set by a user, a reading attribute of the reading unit, and a content of the document read by the reading unit; and limiting selectable transmission modes of the transmission unit based on the at least one of the user-designated attribute, the reading attribute and the content.

BRIEF DESCRIPTION OF DRAWINGS

FIG. 12 is a diagram showing an example of a setting for a secrecy level table for storing a relationship between a character string and a secrecy level;

DESCRIPTION

An image reading apparatus according to exemplified embodiments of the present invention will be described in detail with reference to the accompanying drawings. In the present embodiment, a Multi Function Peripheral (MFP) having a reading and transmission functions of reading a document and transmitting image data of the document to other information processing apparatus.

(Overall Configuration of MFP)

Figure 1:
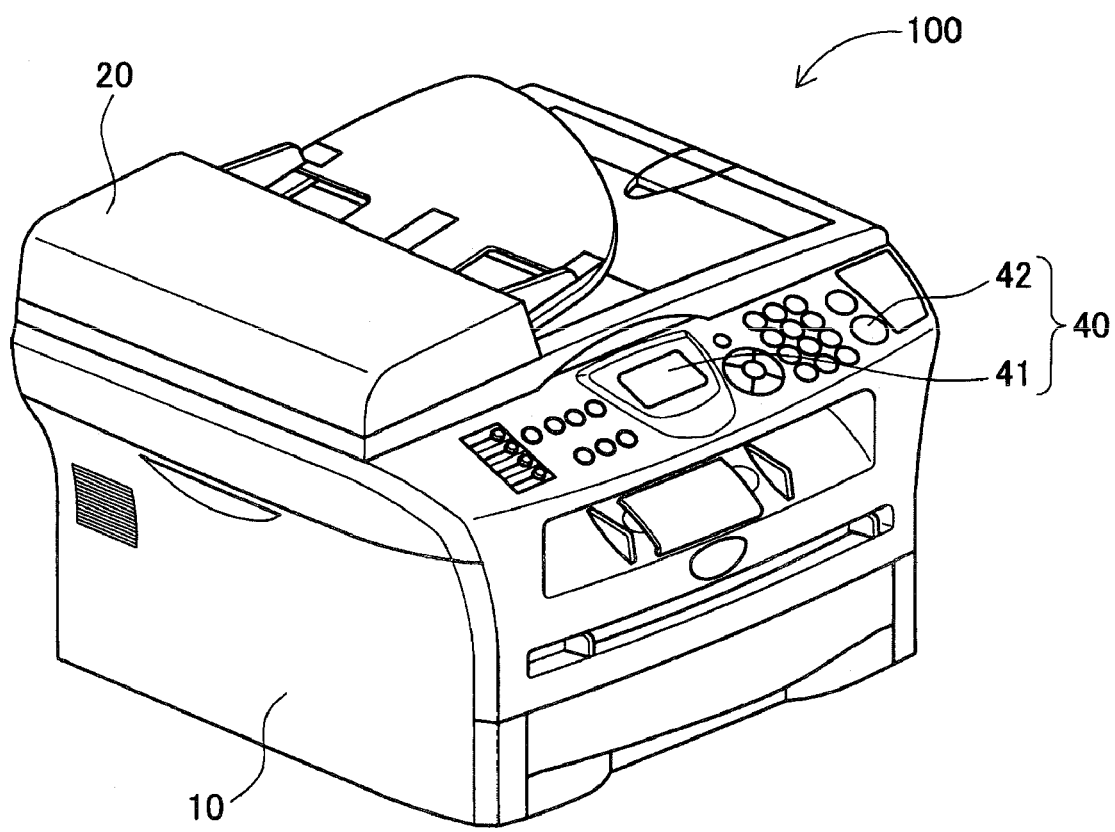
FIG. 1 is a perspective view of a multi function peripheral according to an embodiment.

As shown in FIG. 1, an MFP 100 of the embodiment includes: an image forming unit 10 configured to print an image on a sheet; and an image reading unit 20 (one example of a reading unit) configured to read an image of a document.

The MFP 100 further includes: an operation panel 40 (one example of a temporary specifying unit, a re-specifying unit and a specifying unit) disposed on a front side of the image reading unit 20 and including a display unit 41 such as a liquid crystal display device; and a button group 42 including keys such as a start key, a stop key, a ten-key pad, etc. The operation panel enables a display of an operation state or an input operation by a user.

The image forming unit 10 forms an image based on image data of a document read by the image reading unit 20 or image data transmitted from an information terminal apparatus such as a personal computer (PC), and prints the image on a sheet. An image forming method may be an electrophotographic method or an ink-jet method. The image forming unit 10 may support a color image printing or may be dedicated to a monochrome image printing. The MFP 100 of the embodiments is exemplified as a color image forming apparatus of an electrophotographic method.

The image reading unit 20 reads a document set on a document table and creates image data. The image reading unit 20 includes an Auto Document Feeder (ADF) configured to automatically conveying a document in a position located in the uppermost part of the MFP 100, and can read a plurality of documents continuously.

The MFP 100 has a transmission function of transmitting image data of a document read by the image reading unit 20 to an external information terminal apparatus. In the MFP 100, a plurality transmission modes are supported, and the transmission mode is selected before the transmission of image data. As used herein, the term "transmission mode" means a transmission mode for use in the transmission of the image data, for example, the communication line, the transmission system, the transmission protocol, and so on. The MFP 100 of the embodiment supports three transmission modes: FAX transmission mode; electronic mail transmission mode; and FTP transmission mode. The transmission modes are merely one example, and the transmission modes are not limited to these. Details of selection of the transmission mode will be described below.

(Electrical Configuration of MFP)

Figure 2:
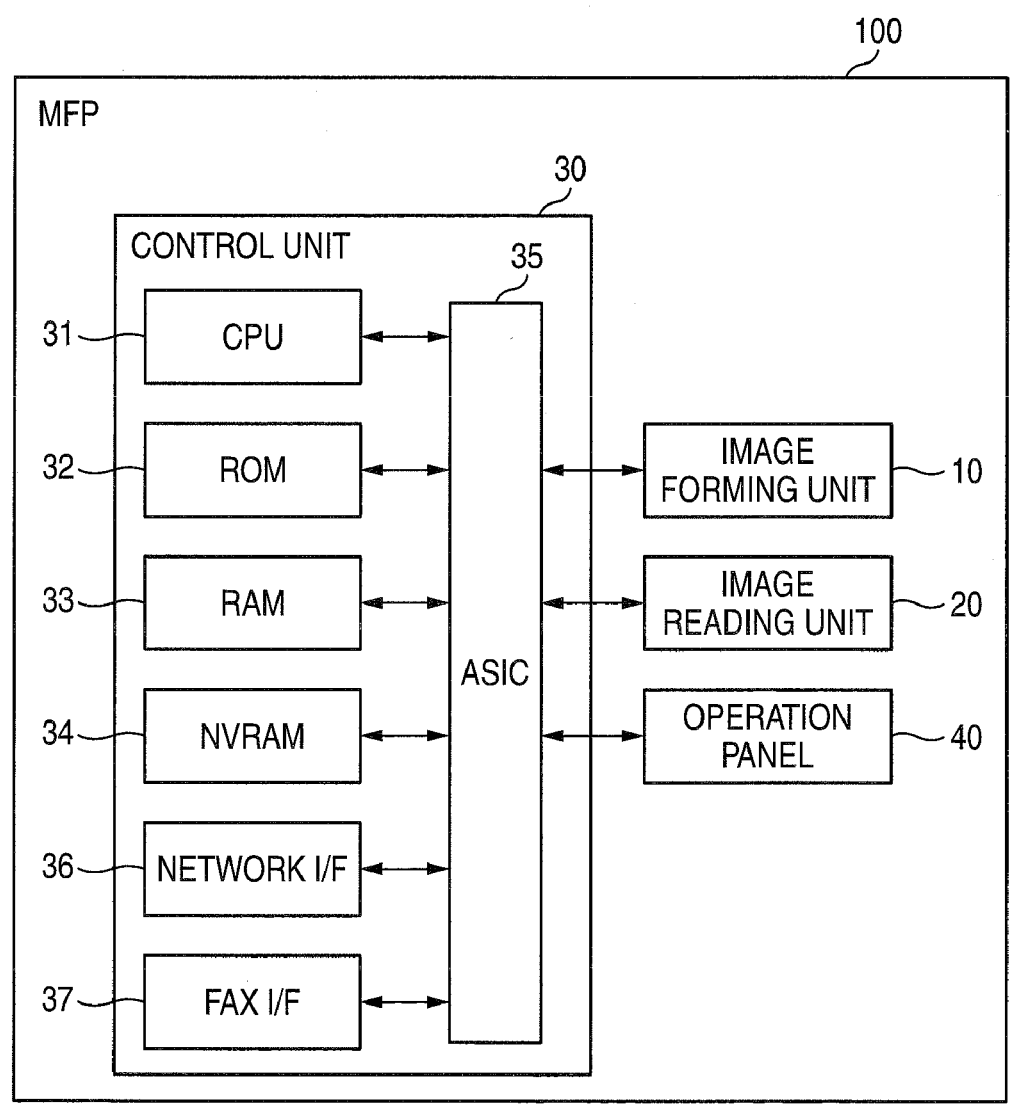
FIG. 2 is a block diagram showing an electrical configuration of the multi function peripheral according to the embodiment.

An Electrical configuration of the MFP 100 will be described. As shown in FIG. 2, the MFP 100 includes a control unit 30. The control unit 30 includes a central processing unit (CPU) 31, a read only memory (ROM) 32, a random access memory (RAM) 33, a nonvolatile random access memory (NVRAM) 34, an application specific integrated circuit (ASIC) 35, a network interface (network I/F) 36 (one example of a transmission unit) and a FAX interface (FAX I/F) 37 (one example of a transmission unit). The ASIC 35 of the control unit 30 is electrically connected to the image forming unit 10, the image reading unit 20, the operation panel 40.

The CPU 31 executes computation for implementing various functions such as an image forming function or an image reading function in the MFP 100, and operates as the center of control. The ROM 32 stores therein an initial value, various settings, various control programs, etc. for controlling the MFP 100. The RAM 33 is used as a work area in which various control programs are read or as a storage area in which image data is temporarily stored. The NVRAM 34 retains the data stored therein even when the power is turned off, and is used as a storage area in which various settings, image data, etc. are retained.

The CPU 31 controls, based on a signal sent from various sensors or a control program read from the ROM 32, each of the components (for example, lighting timing of an exposure device provided in the image forming unit 10, a driving motors (not shown) of various rollers provided in a conveyance path of a sheet, or a motor (not shown) for movement of an image sensor unit provided in the image reading unit 20) of the MFP 100, while storing the processing result of the signal in the RAM 33 or the NVRAM 34.

The network interface 36 is connected to a network such as the Internet and can make connection to an information processing apparatus such as a PC. The FAX interface 37 is connected to a telephone line and can make connection to a FAX apparatus of the opponent side. Then, an exchange of a job with other information processing apparatus through the network interface 36 or the FAX interface 37 can be performed.

(Reading and Transmitting Processing)

Subsequently, reading and transmitting processing of the MFP 100 will be described. The MFP 100 includes a reading and transmitting function of continuously performing a reading process of reading a document and a transmission process of transmitting image data of document by one job.

Figure 3:
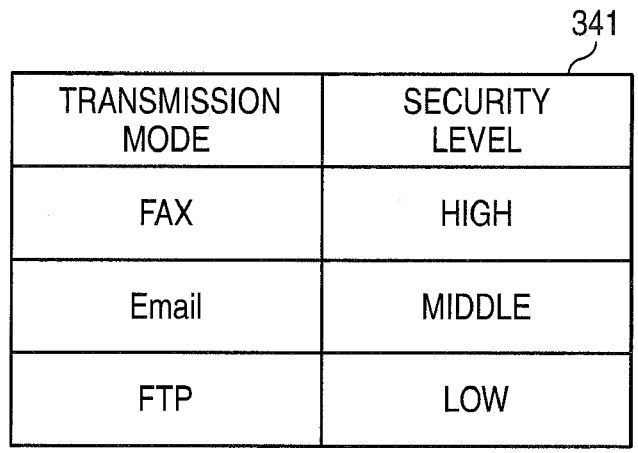
FIG. 3 is a diagram showing an example of a setting for a security level table for storing a relationship between a transmission mode and a security level.

When the reading and transmitting processing is performed, the MFP 100 previously stores a security level of each of the transmission modes. Specifically, a security level table 341 for storing a relationship between the transmission mode and the security level is stored in the NVRAM 34 of the MFP 100 as shown in FIG. 3. Any of "high", "middle" and "low" is set as the security level. The security level associated with each of the transmission modes may be a fixed value or may be changed by a user. In the example of the security level table 341 shown in FIG. 3, the FAX transmission mode is associated with the high security level, the E-mail transmission mode is associated with the middle security level, and the FTP transmission mode is associated with the low security level. Generally, the internet line typified by electronic mail or FTP has easier unauthorized access and lower security than the telephone line typified by FAX communication. According to this aspect, the security level table 341 is exemplified. However, the setting of the security level is not limited thereto.

Two embodiments will hereinafter be described with respect to a procedure of the reading and transmitting processing. Specifically, in a first embodiment, a user inputs a secrecy level (that is, a secrecy level of image data to be transmitted) of a document. In a second embodiment, the MFP 100 automatically determines a secrecy level based on image data.

FIRST EMBODIMENT

First, reading and transmitting processing (one example of a reading unit, a transmission unit, a limiting unit and a designation unit) of the first embodiment will be described with reference to a flowchart of FIG. 4. The present processing is executed every time a user instructs to perform the reading and transmitting processing by operating the operation panel 40.

Figure 5:
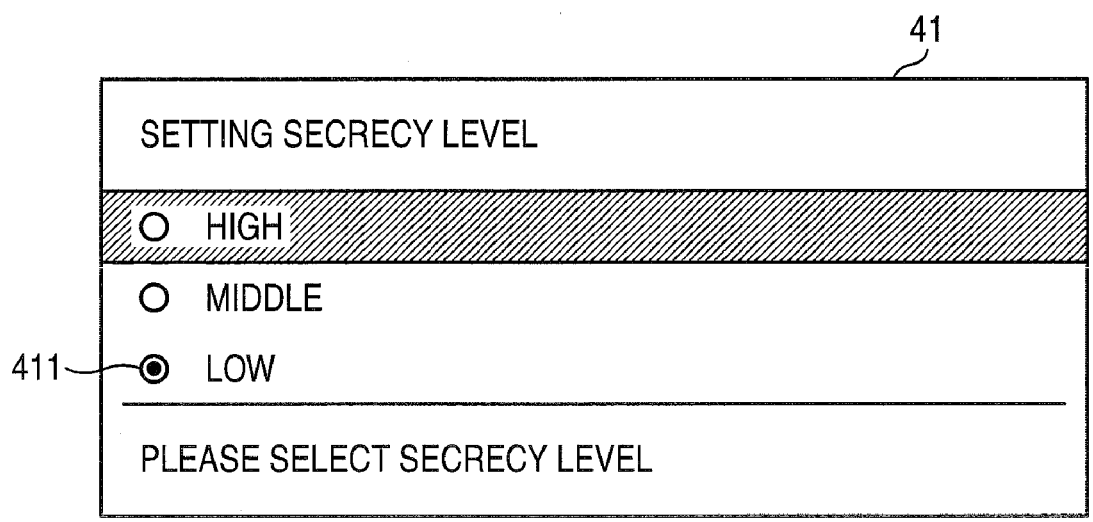
FIG. 5 is a diagram showing an example of a secrecy level input screen.

A secrecy level setting screen shown in FIG. 5 is first displayed on the display unit 41 of the operation panel 40 and an input of a secrecy level of a document is received (S101). That is, the secrecy level of the read document is obtained. In the present embodiment, one of three levels, i.e., "high", "middle" and "low" levels can be set as the secrecy level. The user selects one level from among the three levels by radio buttons 411 and thereby, the MFP 100 obtains the secrecy level of the document.

Figure 6:
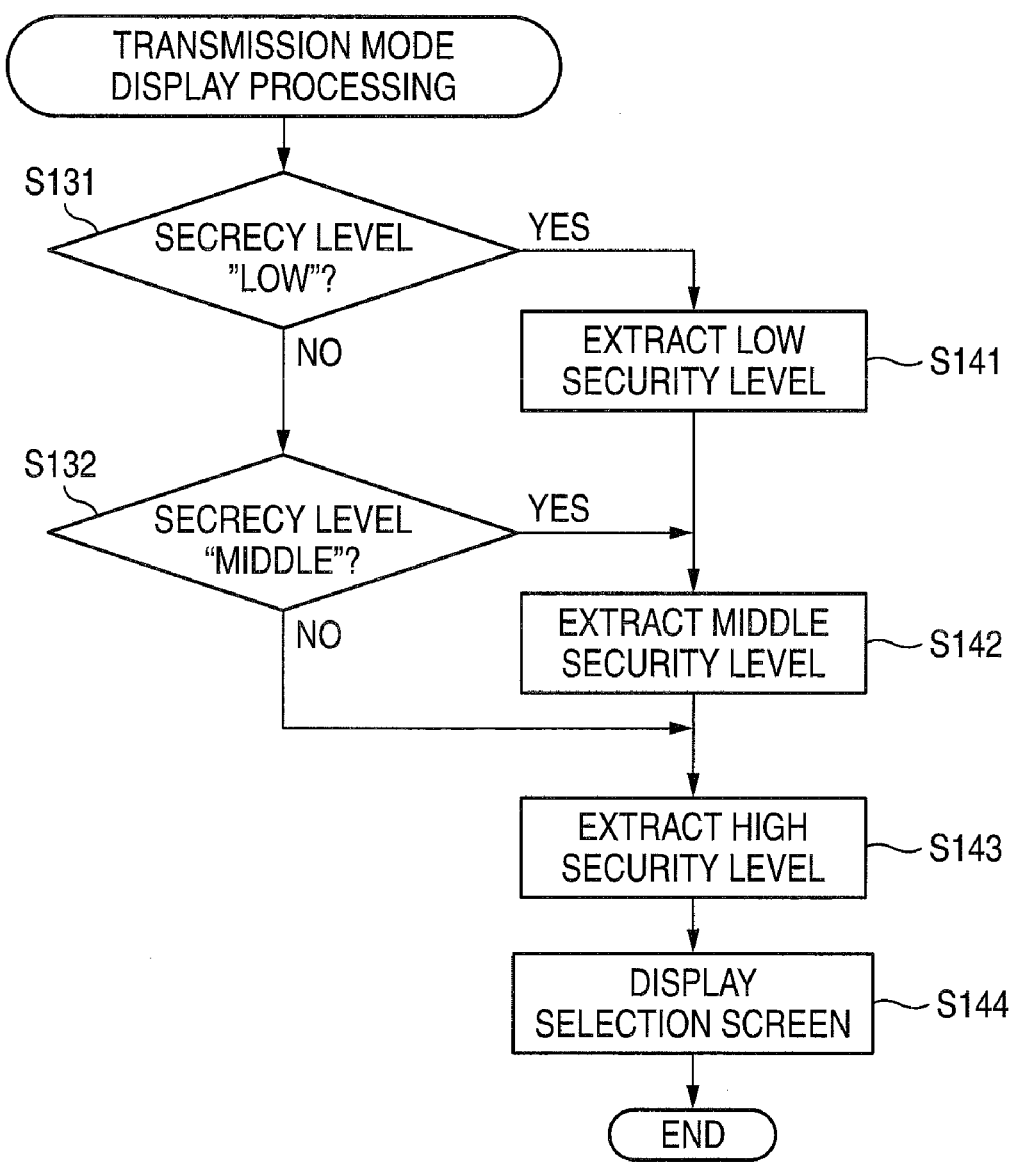
FIG. 6 is a flowchart showing a procedure of transmission mode display processing.

Next, an applicable transmission mode is extracted according to the input secrecy level and the extracted transmission mode is displayed on the display unit 41 (S102). Details of transmission mode display processing of S102 are shown in a flowchart of FIG. 6. It is first determined whether the input secrecy level is "low" (S131). if the secrecy level is "low" (S131: YES), a transmission mode associated with the "low" security level extracted with reference to the security level table 341 shown in FIG. 3 (S141). Thereafter, the flowchart proceeds to S142, and a transmission mode associated with the security "middle" level is extracted. Thereafter, the flowchart proceeds to S143, and a transmission mode associated with the "high" security level is extracted. In other words, if the secrecy level is "low", damage to information leakage is small, so that all the transmission modes are extracted.

If the secrecy level is not "low" (S131: NO), it is determined whether the input secrecy level is "middle" (S132). If the secrecy level is "middle" (S132: YES), a transmission mode associated with the "middle" security level is extracted (S142). Thereafter, the flowchart proceeds to S143, and a transmission mode associated with the "high" security level is extracted. In other words, if the secrecy level is "middle", the transmission modes associated with the "high" and "middle" security levels are extracted.

If the secrecy level is not "middle" (S132: NO), it can be determined that the input secrecy level is "high". As a result, the flowchart proceeds to S143, and a transmission mode associated with the "high" security level is extracted. In other words, if the secrecy level is "high", damage to information leakage is large, so that only the transmission mode associated with the "high" security level is extracted.

Figure 7:
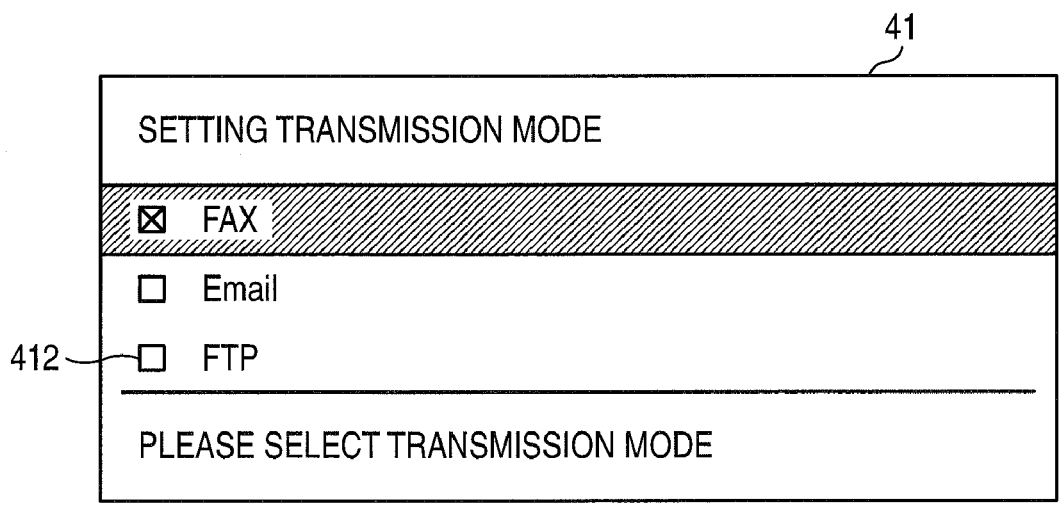
FIG. 7 is a diagram showing an example of a transmission mode input screen (when a low secrecy level)
Figure 8:
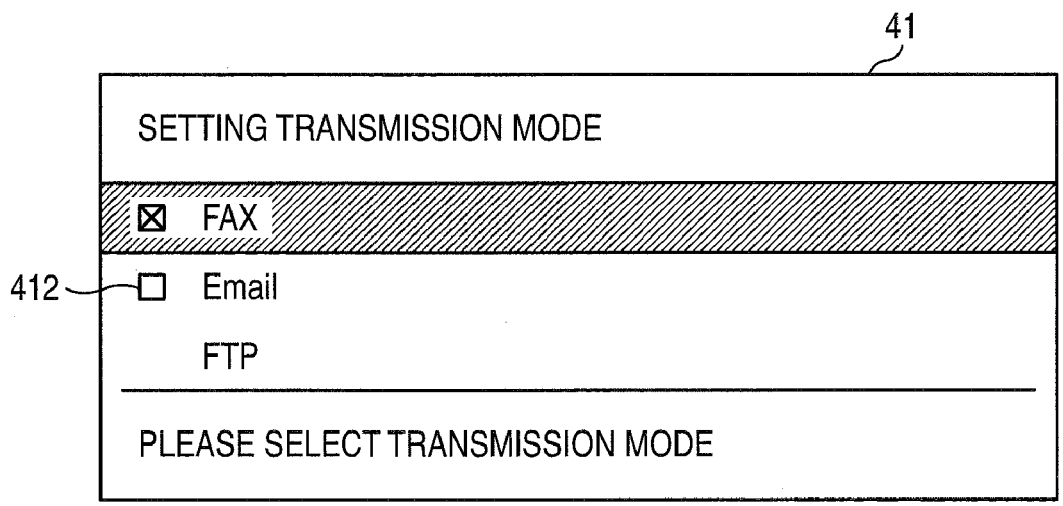
FIG. 8 is a diagram showing an example of the transmission mode input screen (when a middle secrecy level)

Thereafter, a transmission mode setting screen to indicate the extracted transmission mode as a selectable mode is displayed on the display unit 41 of the operation panel 40 (S144). In the transmission mode setting screen, names of the transmission modes supported by the MFP 100 and check boxes 412 associated with the names are displayed as shown in FIG. 7. The transmission mode is selected by turning on this check box. When the transmission mode setting screen is displayed, for example, if a secrecy level is "low", all the transmission modes are extracted, so that the check boxes 412 are displayed for all the transmission modes as shown in FIG. 7. As a result, all the transmission modes are selectable. On the other hand, if the secrecy level is "middle", the transmission modes associated with the "high" and "middle" security levels are extracted, but the transmission mode associated with the "low" security level is not extracted. As a result, as shown in FIG. 8, the check boxes 412 are displayed for the transmission modes associated with the "high" and "middle" security levels, but the check box 412 is not displayed for the transmission mode associated with the "low" security level. In other words, the transmission mode setting screen 41 shown in FIG. 8 shows a state in which the transmission mode associated with the "low" security level is limited.

Figure 4:
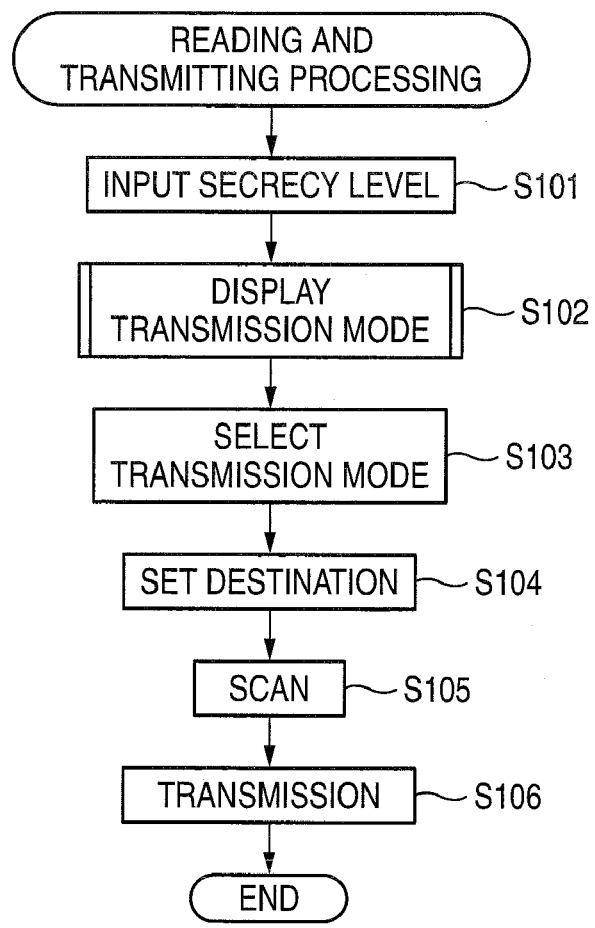
FIG. 4 is a flowchart showing a procedure of reading and transmitting processing according to a first embodiment.

Returning to description of the flowchart of FIG. 4, the transmission mode is selected (S103). That is, the transmission mode for transmitting image data is obtained. Specifically, in the present embodiment, a user turns on the check box 412, and thereby the user can recognize that the transmission mode corresponding to the turned-on check box 412 is selected. In S103, one or more transmission modes may be selected.

Figures 9, 10:
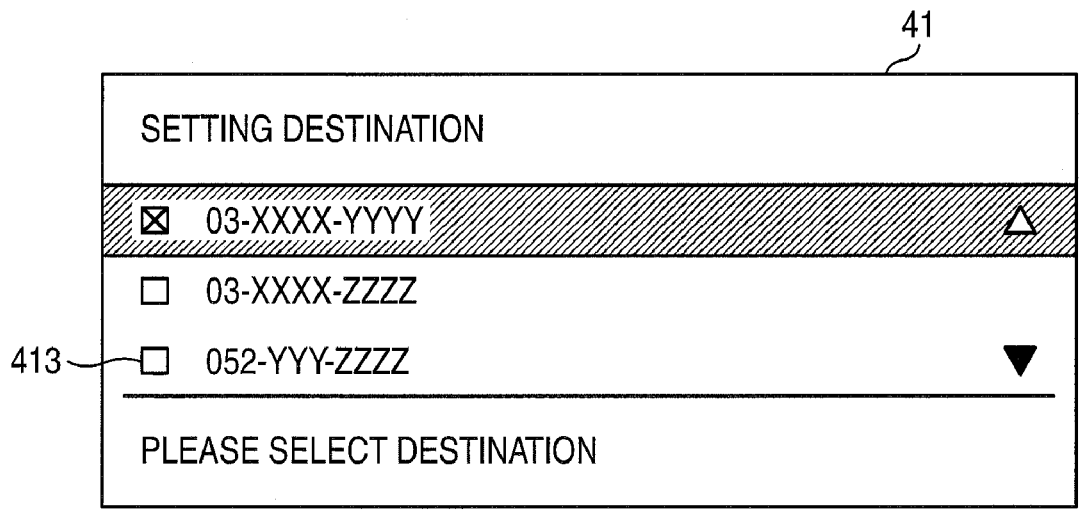
FIG. 9 is a diagram showing an example of a destination input screen.
FIG. 10 is a diagram showing a setting example of a secrecy level table for storing a relationship between a reading parameter and a secrecy level.

Next, a destination used as a transmission destination of image data is set (S104). In the destination, a number or an address may be input directly, or if the MFP 100 has a database such as an address book, the destination may be selected from the database. For example, if the FAX transmission is selected as a transmission mode and the MFP 100 has an address book storing FAX numbers, a destination selection screen shown in FIG. 9 is displayed and a check box 413 corresponding to the FAX number used as a transmission destination is selected from among the FAX numbers listed.

After the destination is set, reading processing of a document by the image reading unit 20 is started (S105). Then, image data of the read document is transmitted to the destination set in S104 by the transmission mode set in S103 (S106). After the image data is transmitted, the present processing is terminated.

In the procedure described above, secrecy for determining a limited target of the transmission mode is obtained by the direct input by the user. However, the secrecy may be automatically obtained from a reading parameter (resolution, color/monochrome setting, etc.) of the document. For example, by storing a secrecy level table 342 shown in FIG. 10 for storing a relationship between a secrecy level and the reading parameter of the document in the NVRAM 34, the secrecy level can be determined based on the reading parameter. In this case, it is unnecessary for the user to input the secrecy level. When the secrecy level is determined using the secrecy level table 342, a plurality items of the reading parameters associated with a different secrecy levels may be determined. In that case, a highest secrecy level from the determined secrecy levels is set. For example, in an example of FIG. 10, in the case of resolution of 600 dpi and color printing, a "low" secrecy level associated with the resolution of 600 dpi does not match with a middle" secrecy level associated with the color printing. In that case, the secrecy level is set at a higher level thereof, i.e., the "middle" secrecy level.

In the example described above, the secrecy level is once obtained from the reading parameter and then the transmission mode of the limit target is determined according to the obtained secrecy level. However, if the MFP 100 has a database defining the transmission mode for the limit target in association with each of the reading parameters is stored, the transmission mode of a limiting target may be determined directly based on the reading parameter.

SECOND EMBODIMENT

Subsequently, reading and transmitting processing (one example of a reading unit, a transmitting unit, a limiting unit, a first designation unit, a second designation unit and a designation unit) of a second embodiment will be described with reference to a flowchart of FIG. 11. The present embodiment differs from the first embodiment in that a secrecy level is automatically determined based on image data of a read document. The present processing is executed every time a user instructs to perform the reading and transmitting processing by operating the operation panel 40 similar to the first embodiment. Also, reference numerals similar to the first embodiment are assigned to processing similar to the first embodiment.

A setting screen of a transmission mode is first displayed on the display unit 41 of the operation panel 40, and a temporary setting of the transmission mode is accepted (S201). In this temporary setting, all the transmission modes supported by the MFP 100 may be selected. Next, a destination used as a transmission destination of image data is set (S104). After the destination is set, reading of a document is started (S105).

Then, a secrecy level is determined based on image data of the document (S202). The secrecy level is determined by analyzing the content of the image data. Specifically, in the present embodiment, a secrecy level table 343 shown in FIG. 12 for storing a relationship between the secrecy level and a particular character string is stored in the NVRAM 34. For example, a character string meaning of a secret, e.g., "confidential" or "for internal use only" is set at a "high" secrecy level. A character string indicating a particular appointment such as a "president" or a special department such as a "management department" is set at a "middle" secrecy level. Then, the content of the document are analyzed using a character recognition technique such as OCR, and a particular character string stored in the secrecy level table 343 is extracted. Then, the secrecy level is determined according to the extracted character string. In addition, if the character string is not extracted, the secrecy level is set at a "low" secrecy level.

Figure 13:
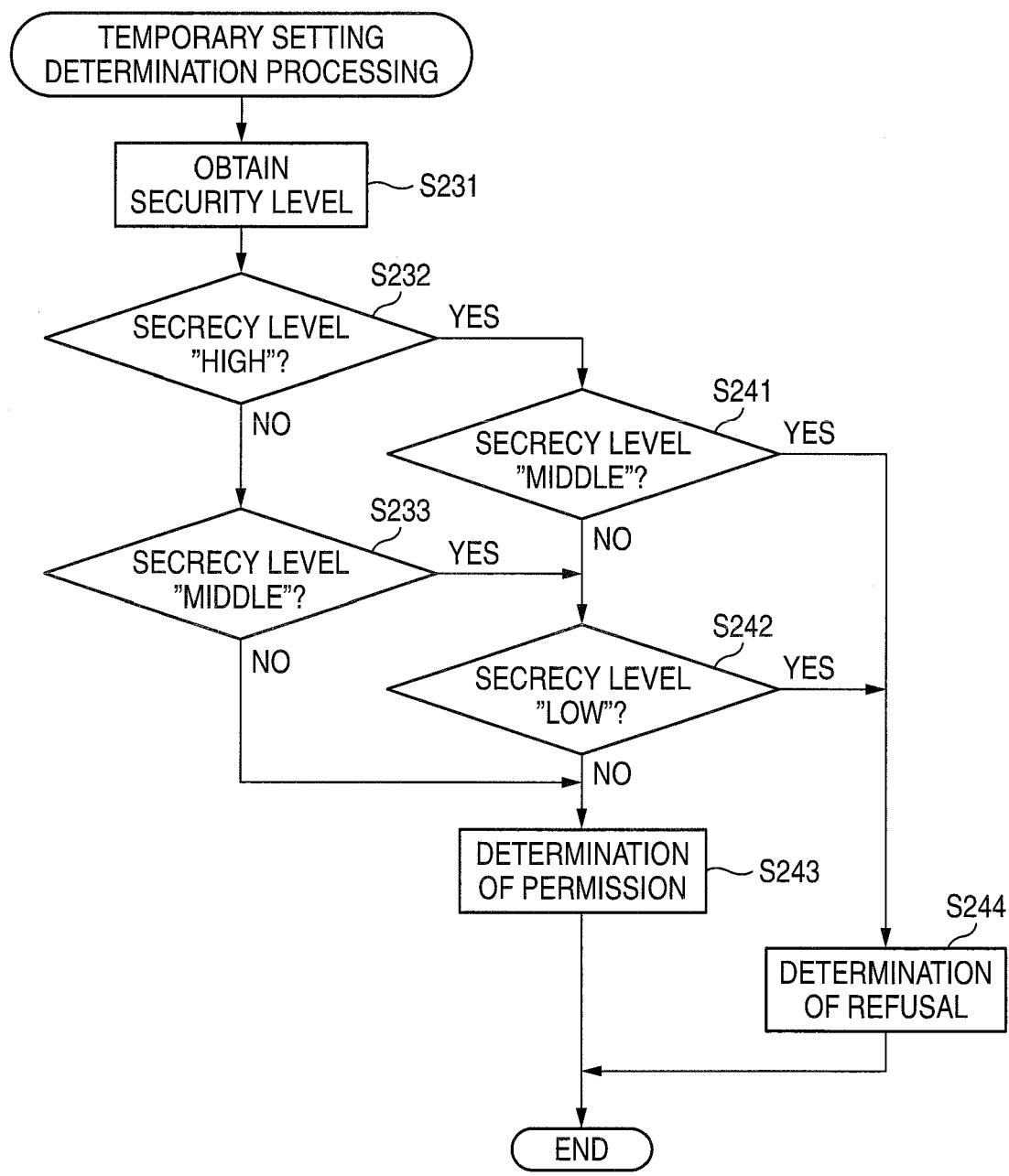
FIG. 13 is a flowchart showing a procedure of temporary setting determination processing.

After the secrecy level is determined, it is determined whether the transmission mode temporarily set in the processing of S201 is permitted by the secrecy level determined in the processing of S202 (S203). Details of temporary setting determination processing of this S203 are shown in a flowchart of FIG. 13. First, a security level of the temporarily set transmission mode is obtained with reference to the security level table 341 (S231).

Figure 11:
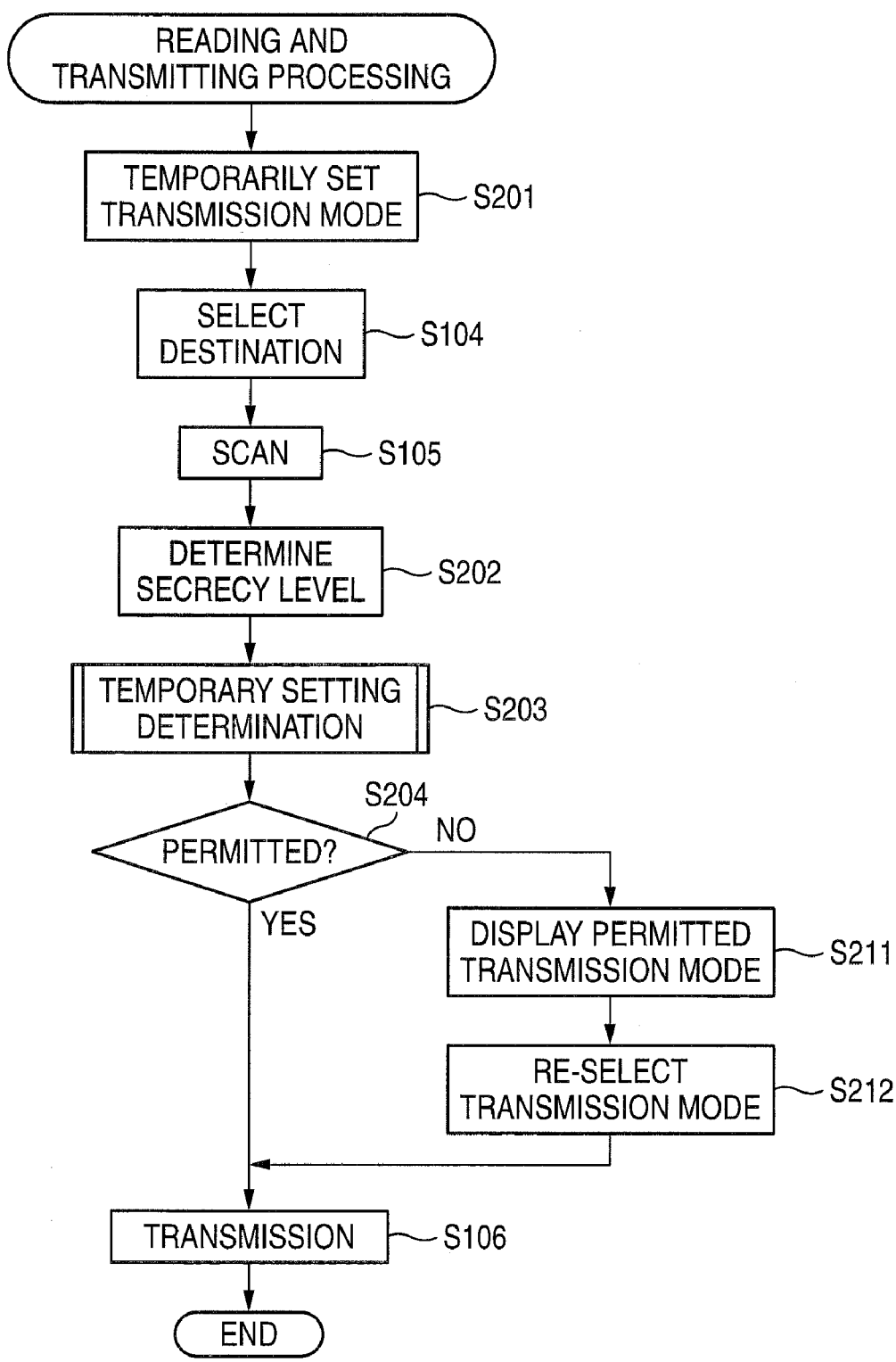
FIG. 11 is a flowchart showing a procedure of reading and transmitting processing according to a second embodiment.

Next, it is determined whether the secrecy level determined in S202 of FIG. 11 is "high" (S232). If the secrecy level is "high" (S232: YES), it is determined whether the security level of the transmission mode temporarily set in S201 of FIG. 11 is "middle" (S241). If the security level is not "middle" (S241: NO), it is determined whether the security level is "low" (S242). If the security level is not "low" (S242: NO), it can be determined that the security level is "high". As a result, a determination of permission is made (S243). On the other hand, if the security level is "middle" (S241: YES) or "low" (S242: YES), the security level corresponding to the temporarily set transmission mode is unsuitable for transmitting image data with a "high" secrecy level, so that a determination of refusal is made (S244).

On the other hand, if the secrecy level is not "high" (S232: NO), it is decided whether the secrecy level is "middle" (S233). If the secrecy level is "middle" (S233: YES), it is determined whether the security level of the temporarily set transmission mode is "low" (S242). If the security level is not "low" (S242: NO), it can be determined that the security level is "high" or "middle". As a result, a determination of permission is made (S243). On the other hand, if the security level is "low" (S242: YES), the security level of the temporarily set transmission mode is unsuitable for transmitting the image data with the "middle" secrecy level, so that a determination of refusal is made (S244).

If the secrecy level is not "middle" (S233: NO), it can be determined that the secrecy level is "low". Therefore, all the transmission modes are permitted, so that the flowchart proceeds to S243 and a determination of permission is made.

Returning to description of the flowchart of FIG. 11, it is determined whether the determination of S203 is a determination of permission (S204). If the determination of permission is made (S204: YES), image data of the document is transmitted by the temporarily set transmission mode (S106) and the present processing is terminated.

Figure 14:
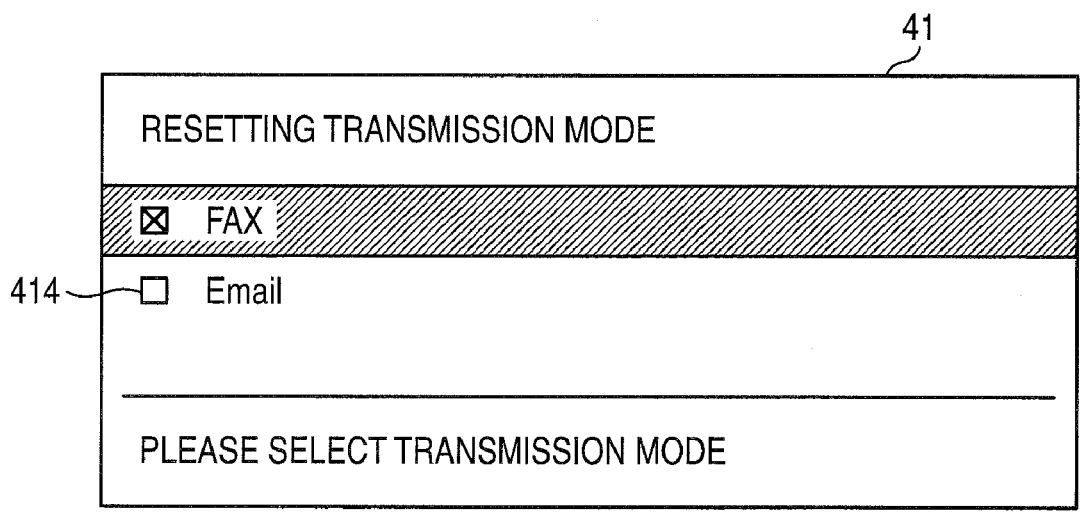
FIG. 14 is a diagram showing an example of a transmission mode resetting screen.

If the determination of refusal is made (S204: NO), the transmission mode permitted by the secrecy level determined in S202 is extracted, and the transmission mode resetting screen indicating the extracted transmission mode as a selectable mode is displayed on the display unit 41 of the operation panel 40 (S211). In the transmission mode resetting screen, names of the permitted transmission modes and check boxes 414 associated with the names are displayed, as shown in FIG. 14. For example, if a transmission mode is set at FTP transmission as temporary setting and a character string of "president" is extracted, a security level of the transmission mode is low" but a secrecy level obtained from the content of a document is "middle", so that it is targeted for resetting. In this case, only the transmission modes permitted by a "middle" secrecy level are displayed on the transmission mode resetting screen. That is, in this example, the transmission modes associated with the middle and high secrecy levels are displayed.

Thereafter, the re-selection of the transmission mode is accepted (S212). That is, the transmission mode for transmitting image data is re-obtained. Then, image data of the document is transmitted by the reset transmission mode (S106), and the present processing is terminated.

In the second embodiment, a particular character string in a document is extracted and a transmission mode of a limit target is determined, but it is not limited thereto. For example, other than the character string, a particular mark may be extracted. Also, if a special mark such as a bar code or a QR code (registered trademark) is printed, or a storage medium such as an Radio Frequency Identification (RFID) tag is attached to a document, information contained in the mark or medium may be read so as to determine the secrecy level.

As described above in detail, the MFP 100 of the embodiment limits a transmission mode according to the user input (first embodiment), the reading parameter (first embodiment) or the content of image data of a document (second embodiment). Consequently, selection of a transmission mode unsuitable for the transmission can be avoided. Therefore, security of data transmission improves and prevention of leakage of information can be expected.

In the first embodiment, a secrecy level is directly input (designated) by a user. As a result, the user oneself can decide secrecy and a transmission mode suitable for need of the user can be selected. In the second embodiment, a secrecy level is automatically determined based on image data of a read document. As a result, it becomes unnecessary to input the secrecy level necessary to decide a transmission mode targeted for limit Therefore, time and effort of operation are small. Further, an incorrect input of the user can be avoided.

The above-described embodiments are only illustrative, and the invention is not limited thereto. Therefore, various improvements and modifications may be made without departing from the scope of the invention. For example, it is not limited to the MFP, and an image reading apparatus such as a scanner having a transmission function supporting a plurality of transmission modes may be applied.

Also, in the embodiment, a secrecy level of a document and a security level of a transmission mode are divided into three levels of "high", "middle" and "low", but a criterion indicating the level of each index is not limited thereto. For example, two levels or four or more levels may be used.

Also, in the embodiment, for limiting the selectable transmission modes, a transmission mode of a limit target is not displayed, or a check box corresponding to the transmission limited mode is not displayed, but it is not limited thereto. For example, the transmission mode of the limit target may be grayed out and may be inhibited to be selected.

Also, a transmission mode of a limit target may be determined by a combination of the first embodiment and the second embodiment. That is, the limit target could be determined based on at least one of: an attribute of the document set by the user (e.g., the secrecy level input through the operation panel 40); a reading attribute of the reading unit (e.g., the setting of the reading unit 20 for reading the document, such as the resolution, the color/monochrome, etc); and the content of the document read by the reading unit (e.g., particular image such as predetermined mark, character string, contained in the image data created by the reading unit 20). Also, a plurality conditions may be combined. For example, the secrecy level directly input by the user may be compared with the secrecy level determined from the content of the document, and a stricter (higher) secrecy level may be set.

In the above-described embodiments, the use of a transmission mode is limited by using the secrecy level of the document as an index. However, the index for use in the limit processing is not limited to the secrecy level. For example, the number of pages of the document or a data size of the image data may be used as an index, and if values (one example of a degree) thereof are large (a communication load is large), selection of a transmission mode with low communication performance is limited. For example, when a color image data is transmitted, a receiving side FAX apparatus may not support a color output in the FAX transmission, and the amount of data tends to become too large in the electronic mail transmission. As a result, only the FTP transmission may be selected.

What is claimed is:

1. An image reading apparatus comprising:
   a transmission unit supporting a plurality of transmission modes and configured to transmit the image data to an external apparatus using at least one selected from the plurality of transmission modes;
   a limiting unit configured to limit selectable transmission modes of the transmission unit based on at least one of: a security level of the document set by a user; a reading attribute of the reading unit; and a content of the document read by the reading unit;
   a display unit configured to display the selectable transmission modes limited by the limiting unit;
   a receiving unit configured to receive a selected selection result of the selectable transmission modes displayed by the display unit; and
   a control unit configured to control the display unit to change a number of the selectable transmission modes displayed thereon based on the limitation by the limiting unit and control the transmission unit to transmit the image data based on the selected selection result received by the receiving unit.

2. The image reading apparatus according to claim 1, wherein the limiting unit limits the selectable transmission modes based on a degree of at least one of indexes, the indexes being determined based on the user-designated attribute of the document, the reading attribute, and the content of the document, respectively.

3. The image reading apparatus according to claim 2, wherein the degree indicates a secrecy level, and
   wherein a number of limited transmission modes increases as the security level increases.

4. The image reading apparatus according to claim 3, wherein the plurality of the transmission modes comprise:
   a first transmission mode using an internet line; and a second transmission mode using a telephone line, and
   wherein the limiting unit limits the first transmission mode when the secrecy level is high.

5. The image reading apparatus according to claim 1, wherein the limiting unit limits the selectable transmission modes based on particular image contained in the content of the document.

6. The image reading apparatus according to claim 1, further comprising:
   a first designation unit configured to accept a first designation of at least one of the plurality of transmission modes before the reading unit reads the document; and
   a second designation unit configured to accept a second designation of at least one of one or more transmission modes which are not limited by the limiting unit, when the first designation contains the transmission mode limited by the limiting unit.

7. The image reading apparatus according to claim 1, further comprising a designation unit configured to accept a designation of at least one of the plurality of transmission modes if there are two or more transmission modes which are not limited by the limiting unit,
   wherein the transmission unit selects the at least one of the plurality of transmission modes which is designated by the designation unit.

8. The image reading apparatus according to claim 1,
   wherein the selectable transmission modes include a FAX transmission mode, an electronic mail transmission mode and an FTP transmission mode,
   wherein the limiting unit further limits the selectable transmission modes based on a security level of the document, and
   wherein the control unit controls the display unit to display the selectable transmission modes such that,
      only the FAX transmission mode is displayed when the security level of the document is high,
      the FAX transmission mode and the electronic mail transmission mode are displayed when the security level of the document is middle, and
      the FAX transmission mode, the electronic mail transmission mode and the FTP transmission mode are displayed when the security level of the document is low.

9. The image reading apparatus according to claim 1,
   wherein the limiting unit limits the selectable transmission modes based on a security level of the document,
   wherein, when a resolution of the document is larger than a predetermined value, the security level of the document is determined to be high, and when the resolution of the document is equal to or smaller than the predetermined value, the security level of the document is determined to be low.

10. The image reading apparatus according to claim 1,
    wherein the limiting unit limits the selectable transmission modes based on a security level of the document,
    wherein, when the document is a color document, the security level of the document is determined to be high, and when the document is a monochrome document, the security level of the document is determined to be low.

11. The image reading apparatus according to claim 1, wherein the limiting unit limits the selectable transmission modes based on the content of the document read by the reading unit.

12. A non-transitory computer readable medium having a computer program stored thereon and readable by a computer; said computer program for control an image reading apparatus that comprises a reading unit configured to read a document and create image data, a transmission unit supporting a plurality of transmission modes and configured to transmit the image data to an external apparatus using at least one selected from the plurality of transmission modes, and a control unit; said computer program, when executed by the control unit, to cause the control unit to perform operations comprising:
    obtaining at least one of a user-designated attribute of the document set by a user, a reading attribute of the reading unit, and a content of the document read by the reading unit;
    limiting selectable transmission modes of the transmission unit based on the at least one of the user-designated attribute, the reading attribute and the content;

displaying the selectable transmission modes limited by the limiting unit;

receiving a selected selection result of the selectable transmission modes displayed by a display unit; and changing a number of the selectable transmission modes displayed on a display unit based on the limitation by the limiting unit and transmitting the image data based on the selected selection result.

13. The computer program according to claim 12,
wherein the selectable transmission modes include a FAX transmission mode, an electronic mail transmission mode and an FTP transmission mode, wherein the limiting operation further limits the selectable transmission modes based on a security level of the document, and wherein the control unit controls a display unit to display the selectable transmission modes such that, only the FAX transmission mode is displayed when the security level of the document is high, the FAX transmission mode and the electronic mail transmission mode are displayed when the security level of the document is middle, and the FAX transmission mode, the electronic mail transmission mode and the FTP transmission mode are displayed when the security level of the document is low.

14. The computer program according to claim 12,
wherein the limiting operation further limits the selectable transmission modes based on a security level of the document, wherein, when a resolution of the document is larger than a predetermined value, the security level of the document is determined to be high, and when the resolution of the document is equal to or smaller than the predetermined value, the security level of the document is determined to be low.

15. The computer program according to claim 12,
wherein the limiting operation further limits the selectable transmission modes based on a security level of the document, wherein, when the document is a color document, the security level of the document is determined to be high, and when the document is a monochrome document, the security level of the document is determined to be low.

* * * * *